July 3, 1962   L. KONRAD   3,042,251
FEEDING MECHANISM FOR AUTOMATIC LATHES
Filed Nov. 5, 1959   2 Sheets-Sheet 1
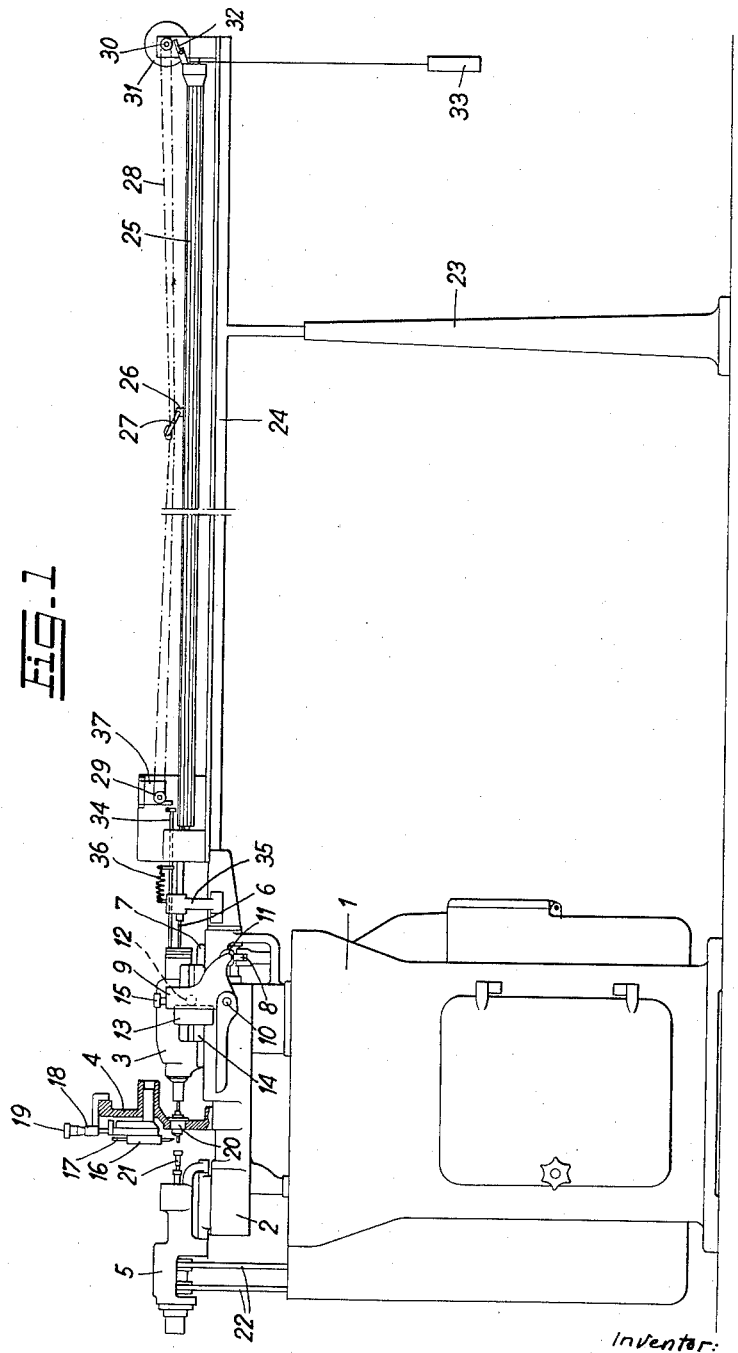
Inventor:
Léon Konrad
by: Michael S. Striker
Attorney July 3, 1962 L. KONRAD 3,042,251
FEEDING MECHANISM FOR AUTOMATIC LATHES
Filed Nov. 5, 1959 2 Sheets-Sheet 2
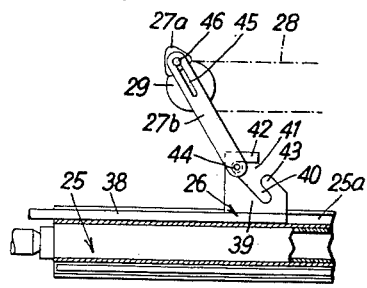
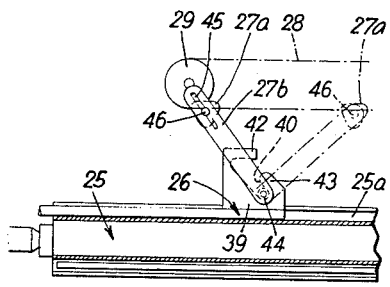
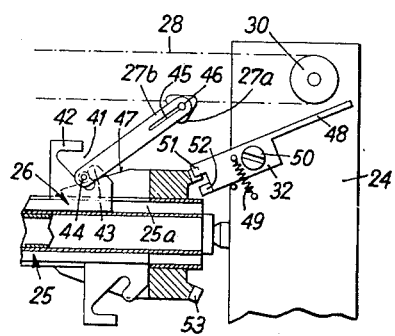
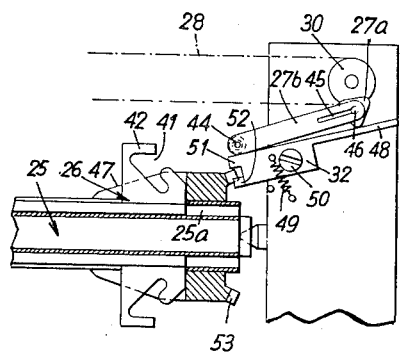
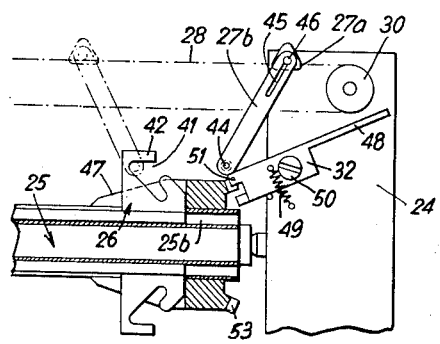
Inventor:
Léon Konrad
by Michael S. Striker
Attorney

United States Patent Office 3,042,251
Patented July 3, 1962

3,042,251
FEEDING MECHANISM FOR AUTOMATIC LATHES
Leon Konrad, Evilard, Switzerland, assignor to Usines Tornos Fabrique de Machines Moutier S.A., Moutier, Switzerland, a joint-stock company of Switzerland
Filed Nov. 5, 1959, Ser. No. 851,184
Claims priority, application Switzerland, Nov. 6, 1958
4 Claims. (Cl. 221—81)

This invention relates to feeding mechanisms for automatic lathes and in particular to feeding mechanisms for lathes arranged for machining series of identical pieces at the end of a stock bar driven in rotation by a head stock of the lathe.

Mechanisms for lathes of this type, in which the bars are pushed through the head stock by means of an endless chain are already known in the art. In these mechanisms the endless chain is connected in such a manner to a pusher that the latter makes a reciprocate movement along a tube of the feeding mechanism, which serves as guiding as well as supporting means for the stock bar driven in rotation by the head stock. In these known mechanisms one of the members of the chain carries a transverse rod entering a vertical slot of said pusher. In accordance therewith this transverse rod drives said pusher forward together with the stock bar when said transverse rod is moving along one portion of the chain. When said transverse rod moves around the foremost chain wheel it also moves in a vertical direction with respect to the pusher within the slot thereof and when said rod moves backward along the other chain portion, it also drives said pusher backward until it is carried around the rearmost chain wheel. Pusher driving means of this type are particularly advantageous if the feeding mechanism is provided with means arranged for introducing automatically new stock bars into said guiding tube. Moreover, said pusher driving means are also advantageous because the endless chain may be driven easily by means of a small asynchronous motor with a great frequency drift since such a motor can be permanently energized.

If the feeding mechanism does, however, not only comprise a single guiding tube but a plurality of such tubes mounted on a revolver drum, each of these tubes contains a pusher and it is then no more so easy to drive each of these pushers by means of an endless chain always driven in the same direction.

It is now an object of this invention to provide a feeding mechanism of simple design which permits of driving the pushers of each of the tubes of a revolver drum by means of an endless chain of the type indicated above.

Still further objects of the invention will become apparent in the course of the following description.

One embodiment of the feeding mechanism according to the invention is represented diagrammatically and by way of example in the drawings annexed hereto.

In the drawings:

FIG. 1 is a general and simplified elevational view of an automatic lathe provided with an automatic feeding mechanism embodying the invention;

FIG. 2 is a part elevational view on a greater scale and with some portions cut away of the feeding mechanism at the moment at which the latter has driven a pusher forward to its extreme position;

FIG. 3 is a view similar to that of FIG. 2 in which said driving mechanism is in another working position;

FIG. 4 is a view analogous to those of the two preceding figures showing said feeding mechanism at the moment at which it drives a pusher in its rearmost position;

FIG. 5 is a view similar to that of FIG. 4 some members of the feeding mechanism being in another working position, and FIG. 6 is a view analogous to those of FIGS. 4 and 5 in which said feeding mechanism starts pulling a pusher forward.

The lathe represented in FIG. 1 comprises a stand 1 in which the chief motor of the lathe is mounted, said motor driving the head stock and every tool of the lathe by means known in the art. The stand 1 carries a framework 2 on which a head stock 3, a support 4 and an auxiliary apparatus 5 are mounted. The head stock 3 comprises a spindle driven in rotation from the chief motor of the lathe by means of a belt (not shown) passing through the framework 2 and set on a pulley (not shown) fixed to said spindle for rotary movements. The spindle itself comprises a chuck capable of gripping a feed or stock bar 6 so as to drive said bar in rotation and to move it in axial direction. To ensure this last motion the head stock 3 is mounted on an axial slide 7 of the framework 2 and it is set under the action of a very strong return spring urging said head stock backward i.e. towards the right in FIG. 1. The forward motion of the head stock 3 is controlled by a cam-shaft extending in parallel with the lathe on the backside thereof. To actuate the head stock 3 this cam-shaft carries a cam (not shown) cooperating with a lever 8 pivoting around an axis parallel to the lathe's axis, said lever extending from the rear side of the framework 2 to the front side thereof. A crank lever 9 located on the front side of the lathe is pivotally mounted on a trunnion 10 and this crank lever is set under the action of lever 8. At one of its ends this lever 8 carries a finger which always remains in contact with said cam and at its other end said lever is in contact with a roller 11 mounted for rotary motions at the end of one arm of lever 9. The other arm of this lever 9 carries a pin 12 against which a plate 13 fixed to the body member of the head stock is permanently bearing under the action of the head stock return spring. To set exactly the two extreme positions of the head stock 3 the body member of the latter carries a slide 14 on which the plate 13 is mounted. Moreover the lever 9 carries a regulating screw 15 which permits of adjusting the position of pin 12 along the corresponding crank lever arm so as to set the length of the axial displacement of the head stock.

The support 4 mounted on framework 2 carries slides in which blocks 16 are mounted. Tools 17 are fixed to the latter so that they extend fanwise substantially in a radial direction with respect to the bar 6. The blocks 16 are moved along their slides upward by means of strong return springs (not shown) and downward by means of levers 18 carrying micrometric regulating screws 19 enabling an exact adjustment of the end position of tools 17. To avoid bending of the bar portion extending in front of the head stock 3 when the tools 17 come in working position, the support 4 carries a sleeve 20 which can be fixed or can comprise a moving part and the bar 6 is carried in this sleeve.

The fanwise arranged tools 17 thus enable machining the side faces of the work pieces at the end of bar 6.

While these tools are only moving forward and then backward radially with respect to the bar, the head stock 3 drives the latter in rotation and moves it forward under said tools through the sleeve 20.

While tools 17 enable machining the lateral faces of the work pieces at the end of bar 6 further tools carried by the auxiliary apparatus 5 enable machining operations coaxially to said pieces from the front end thereof. The tools of apparatus 5 can be drills, borers, taps or die stocks as one of which is shown at 21. Each of these tools is mounted in a rotary spindle of apparatus 5 which carries a movable element carrying all the spindles of said apparatus. This movable element is arranged so that it can bring every spindle successively into the head stock axis. Said element of apparatus 5 can therefore either be a rocker or a revolver drum. When one of the tools of apparatus 5 must come in working position, a cam (not shown) carried by the cam-shaft mounted behind the framework 2 first moves the spindle of this tool into the head stock axis. Another cam of said cam-shaft moves then a lever which urges the spindle being now coaxial to the head stock toward the work piece. Like tools 17 the tools of apparatus 5 successively come in working position in accordance with a pre-determined cycle for every work piece. One tool of apparatus 5 and one tool 17 obviously can work at the same time. The tools of apparatus 5 can be held immobile since bar 6 is driven in rotation by the head stock 3. They can however also be driven in rotation for instance by means of the belts 22 either in the same direction or in the other direction as bar 6.

At the end of the operation cycle of tools 17 and of the tools of apparatus 5 one of the tools 17 is moved across the bar axis to cut the work piece which has just been machined at the end of this bar. After its cutting operation this tool 17 remains in its foremost position until the lathe is ready for beginning a new operation cycle. Before this, the head stock chuck, which came in its foremost position, opens and the head stock 3 moves backward under the action of its return spring through a path having a length exactly equal to that of the work pieces. When this head stock 3 has come in its rearmost position its chuck closes and grips bar 6. The lathe is then ready for machining a new work piece. It suffices therefore that the cutting tool 17, which was still in working position, moves out of the path of bar 6 to enable the head stock 3 moving this bar forward through the sleeve 20 so as to set the foremost end thereof into the operating field of tools 17 and of the tools of apparatus 5.

Since the bars 6 are relatively long with respect to their diameter a guiding and feeding device is associated to the lathe described as shown in FIG. 1. This guiding and feeding device is mounted on a pillar 23. It comprises a framework 24, the front end of which is carried by the framework 2 of the lathe. A revolver drum 25 is pivotally mounted on this framework 24. This drum comprises a plurality of guiding tubes, each of which may contain a feed bar, said guiding tubes thus forming a magazine. The tube of drum 25 which is in the upmost position of this drum is also located coaxially to head stock 3 and it guides and carries the bar 6 on which the lathe is just working. The guiding and feeding device described furthermore comprises a pusher 26 in each tube of the said drum. Each of these pushers 26 is constituted by a rod 38 extending within one of the tubes of drum 25 and by a plate 39 extending across a longitudinal slot 25' of said tubes. A driving member 27 is connected to the plate of the pusher 26 which is carried by the tube being in the upmost position of drum 24, and this driving member 27 urges said pusher against the rear end of bar 6. To avoid any backward motion of said bar together with the head stock 3 at the end of an operation cycle of the lathe and to maintain said bar in contact with the cutting tool, the pusher 26 must exert a sufficient thrust on said bar toward the left in FIG. 1. The driving member 27 therefore is carried by an endless chain 28 mounted on a pair of chain wheels 29, 30 located at the front end and at the rear end, respectively, of said guiding device. This chain 28 is always driven in the same direction by means of a servo-motor 31 which is preferably constituted by a small asynchronous motor having a great frequency drift (almost 20 percent). This motor of a well known type thus exerts a relatively strong thdust on the chain 28 when the latter is to be moved. Moreover this motor can remain at rest without any damage during relatively long periods without breaking its energizing circuit. The motor 31 thus drives the chain 28 as soon as the pusher 26 enables member 27 moving toward the left in FIG. 1, i.e. as soon as the head stock is moving forward. In other words as long as bar 6 is in working position the pusher 26 always bears with a predetermined force against this bar. When the latter has been machined entirely, the member 27 passes around wheel 29 and the motor 31 starts then pulling the pusher 26 backward until it comes in a rearmost position described hereinafter. At that moment the driving member 27 leaves the pusher and passes around wheel 30 while actuating the releasing lever 32 which enables the drum 25 moving one step forward under the action of a weight 33 in a manner described hereinafter. After this motion of drum 25 the next tube thereof comes then in the upmost position and the driving member 27 catches the pusher of this new tube when the motor 31 has carried said member around wheel 30 and urges it forward again toward the left of FIG. 1.

Although the motor 31 is exerting a relatively great driving couple on member 27, this couple does however not suffice to remove from the sleeve 20 the remaining stock bar portion, which cannot be machined furthermore, when the chain 28 starts pulling the member 27 backward after said member has been carried around wheel 29. As described in detail hereinafter the head stock 3 helps the servomotor 31 when the remaining stock bar portions must be removed from the sleeve 20. The lathe comprises therefore a sliding rod 34 shiftably mounted in a support 35 fixed to the framework 2. A return spring 36 provided between the support 35 and the rod 34 maintains the latter in contact with the rear face of a shoulder of the head stock body member. That means that the rod 34 follows the axial displacements of the head stock 3. A device 37 disclosed hereinafter in detail is arranged so as to transmit the backward motions of rod 34 to the pusher 26 at the moment at which member 27 starts pulling this pusher backward i.e. at the moment at which this pusher has to remove the bar 6 from sleeve 20.

The bar portions removed in the manner described from sleeve 20 and from head stock 3 are brought at the rear end of the corresponding tube of drum 25 where they are remaining since the following forward motion of member 27 drives another pusher with a new bar.

When all the bars of drum 25 have been machined the pushers of each of these tubes are then in their rearmost position each with a remaining bar portion which cannot be machined furthermore. The lathe must then be stopped and these remaining bar portions have to be replaced manually by new bars in order to enable the lathe working again in an entirely automatic manner during a relatively long period.

To ensure the functions described above of the feeding mechanism the members driving the pushers are constituted by a link member 27a fixed to the chain 28 and an arm 27b jointed at one end to member 27a and connected at its other end to the pusher plate 39 of the pusher 26 which is mounted in the tube 25a being in the upmost position of drum 25. To enable the connection of arm 27b to the pusher plate 39 the latter is provided with an opening so as to form an inclined elongated slot 40 and a passage 41 limited by a horizontal nose or upper projection 42 and an inclined nose or rear projection 43. The arm 27b carries a projection in form of a pin 44 which may be introduced into slot 40 through the passage 41. At its other end this arm 27b is provided with a longitudinal slot 45 so that this arm may move transversely with respect to link member 27a which carries a pin 46 extending within slot 45. As already stated above the servo-motor drives chain 28 always in the same direction so that the upper portion of this chain is moving forward i.e. toward the left in FIGS. 2–6.

When member 27a is moving along this upper portion of chain 28, the pin 44 of arm 27b is located immediately under nose 42 of the pusher plate 39 and it drives this pusher 26 forward until member 27a comes in the position represented in FIG. 2. In this position the pusher 26 has reached its foremost position. Since this pusher does no longer oppose any resistance to a further motion of member 27a the servo-motor 31 can drive the chain 28 further on so as to carry the member 27a around the chain wheel 29 until it comes in the position represented in full lines in FIG. 3. During this motion the pusher 26 remains at rest with respect to the tube 25a. In the position represented in full lines in FIG. 3 the pin 44 of arm 27b has slid downward within slot 40 of the pusher plate 39 and it is now on the bottom of that slot. Moreover, the pin 46 of member 27a has also slid within slot 45 of member 27b.

After the member 27a has been carried around wheel 29 it comes on the lower chain portion which is moving backward. Said chain may still move further on without driving pusher 26 with respect to tube 25a in any case until member 27a comes in the position represented in dot-and-dash lines in FIG. 3. This figure shows that the passage of member 27a from the position represented in full lines to that which is represented in dot-and-dash lines causes the arm 27b to rock about its pin 44 resting on the bottom of slot 40. Moreover, the pin 46 of member 27a has moved again with respect to arm 27b until it has reached the upmost portion of slot 45 of this arm 27b. From that moment member 27a tends to drive the pusher 26 backward because pin 44 of arm 27b is caught behind nose 43 of the pusher plate 39.

If the remaining stock bar portion has to be removed from the head stock, as is usually the case with sliding head stock lathes, member 27a can move freely toward the right under the action of the servo-motor 31 together with the pusher 26 and with said remaining stock bar portion to which the pusher must be fixed with respect of axial movement.

During this backward motion of the members in question the latter come once in the position represented in FIG. 4, in which the pusher 26 is in the vicinity of its rearmost position. As shown in this figure the drum 25 is provided with camming surfaces 47 at its rear end, said surfaces being arranged so that pin 44 of arm 27b comes in contact therewith when said members are moved toward the rear end of the feeding mechanism. The object of these camming surfaces 47 is to lift pin 44 out of engagement with nose 43 so as to get it out of slot 40 as may be seen while comparing FIGS. 4 and 5 with one another.

As shown in FIG. 5 the pin 44 of arm 27b left the pusher 36 which is now in its rearmost position. Link member 27a starts moving round the chain wheel 30 and it actuates at the same time a tail portion 48 of the releasing lever 32 while causing the latter to rock round its fixing screw 50 against the action of spring 49. As soon as link member 27a releases the tail portion 48, the spring 49 urges lever 32 back to its original position. This rocking motion of lever 32 permits the drum 25 of moving one step forward under the action of the weight 33. This motion of drum 25 can be ensured by lever 32 because of the two indentations 51 and 52 of this lever which enter alternately the toothing 53 formed at the rear end of drum 25. The specific mechanism for stepwise turning of drum 25 does not form part of the present invention and is more fully described in my co-pending application Serial No. 851,196, filed November 5, 1959.

During its further motion the chain 28 moves member 27a round wheel 30 until said member comes again on the upper portion of this chain and moves forward with respect to the feeding mechanism as shown in FIG. 6. During this last motion the pin 44 of arm 27b also moves forward until it enters the slot 40 and engages the nose 42 as shown in the position represented in dot-and-dash lines in FIG. 6. The chain 28 then tends to drive the pusher 26 of the new tube 25b of drum 25, which has come meanwhile in the upmost position of this drum.

The forward motion of pusher 26 drives the stock bar located in the tube 25b until its front end has passed through the head stock and the sleeve of the lathe and comes in contact with the cutting tool. This new stock bar can then be machined until the driving members 27 come in the position represented in FIG. 2.

The feeding mechanism disclosed above enables the lathe to which it is associated to work in an absolutely independent manner during the whole time necessary for machining all the bars stocked in the tubes of drum 25.

Although one embodiment of the invention has been described in detail hereabove, various changes in the shape, sizes and arrangement of parts will appear obvious to those skilled in the art within the scope of the appended claims without departing from the spirit of the invention or sacrificing the advantages thereof.

I claim:

1. In a feeding mechanism for automatic lathes, the combination of: a revolver drum constituted by a plurality of guiding means, each of said guiding means being adapted for receiving a stock bar, said revolver drum being adapted to be moved for successively bringing each of said guiding means in a feeding position; an endless chain; a servo-motor driving said chain; a plurality of pushing means movable axially between a rearmost and a foremost position of the said guiding means, said plurality of pushing means being respectively associated with said guiding means to bear against the stock bars contained in said guiding means; driving means carried by said chain and operatively connected to the pushing means associated with the guiding means which is in feeding position, each of said pushing means comprising a portion provided with an opening and said driving means having a projection extending into said opening to drive the pushing means associated with the guiding means situated in said feeding position forward against the latter and then backward toward a rearmost position, and means to urge said projection out of said opening when said chain has moved said pushing means backward into their rearmost position.

2. The combination of claim 1, said endless chain being mounted above the guiding means of said drum which are in feeding position, said chain passing around a rear chain wheel located above the rear part of said drum and on a front chain wheel located above the front part of said drum, said servo-motor driving said chain always in the same direction so as to move the upper chain portion forward and the lower chain portion backward, said opening of the pushing means having an upper portion for receiving said projection of the driving means when the latter are moved forward with the upper chain portion and a lower portion for receiving said projection of the driving means when the latter are moved backward with the lower chain portion.

3. The combination of claim 2, each of said guiding means consisting of a tube provided with a longitudinal slot, each of said pushing means comprising a rod extending within said tube and a plate fixed to said rod and extending outside said tube through said slot, said opening being provided in the upper rear part of said plate and being delimited by an upper projection and a rear projection of said plate, said driving means comprising an arm carrying said projection arranged transversely to said arm for engagement with said upper projection to drive said pushing means forward and for engagement with said rear projection of said plate to drive said pushing means backward.

4. The combination of claim 1, in which said means to urge said projection out of said opening comprises camming surfaces at the rear end of said revolver drum.

References Cited in the file of this patent
UNITED STATES PATENTS

| | | |
|---|---|---|
| 458,680 | Durie et al. | Sept. 1, 1891 |
| 2,108,274 | Tautz et al. | Feb. 15, 1938 |
| 2,165,912 | Whitman | July 11, 1939 |
| 2,343,914 | Lloyd | Mar. 14, 1944 |
| 2,376,476 | Chatelain | May 22, 1945 |
| 2,746,128 | Barron et al. | May 22, 1956 |
| 2,848,786 | Kendall | Aug. 26, 1958 |